(12) United States Patent
Sirola et al.

(10) Patent No.: US 6,661,404 B1
(45) Date of Patent: Dec. 9, 2003

(54) PORTABLE ELECTRONIC APPARATUS

(75) Inventors: Jukka Sirola, Tampere (FI); Onni Berry, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 386 days.

(21) Appl. No.: 09/236,960

(22) Filed: Jan. 25, 1999

(30) Foreign Application Priority Data

Jan. 29, 1998 (FI) .................................................. 980199

(51) Int. Cl.7 .................................................. G09G 5/00
(52) U.S. Cl. ......................................................... 345/168
(58) Field of Search ................................. 345/156, 168; 455/556, 344, 348; 379/110.01; 708/109

(56) References Cited

U.S. PATENT DOCUMENTS

| | | | | |
|---|---|---|---|---|
| 5,016,002 A | | 5/1991 | Levanto ....................... 340/756 |
| 5,189,632 A | * | 2/1993 | Paajanen et al. ............. 708/109 |
| 5,337,346 A | * | 8/1994 | Uchikura ..................... 455/556 |
| 5,657,370 A | * | 8/1997 | Tsugane et al. .............. 455/550 |
| 5,742,894 A | * | 4/1998 | Jambhekar et al. ........... 455/90 |
| 5,852,483 A | | 12/1998 | Newstead et al. ............. 349/62 |
| 6,014,573 A | * | 1/2000 | Lehtonen et al. ............ 455/569 |
| 6,047,196 A | * | 4/2000 | Makela et al. ............... 455/556 |

FOREIGN PATENT DOCUMENTS

| | | |
|---|---|---|
| EP | 0472361 | 2/1992 |
| EP | 0 534 478 A2 | 3/1993 |
| EP | 0534478 | 3/1993 |
| EP | 0776140 A1 | 5/1997 |
| EP | 0796026 A2 | 9/1997 |
| EP | 0 804 009 A2 | 10/1997 |
| GB | 2297662 | 8/1996 |
| WO | WO 97/12470 | 4/1997 |

OTHER PUBLICATIONS

Finnish Office Action.

* cited by examiner

Primary Examiner—Richard Hjerpe
Assistant Examiner—Alexander Eisen
(74) Attorney, Agent, or Firm—Perman & Green, LLP

(57) ABSTRACT

A mobile communication device has a body portion (2) and a lid (7) hingeably coupled to the body portion (2). The lid (7) is moveable about a hinged joint (8) between open and closed positions in which a surface portion of the body portion (2) is respectively uncovered and covered by the lid. A first plurality of data input keys (11b) are provided on said surface portion of the body portion (2) whilst a second plurality of data input keys (11a) are provided on an inner surface of the lid (7). The first and second plurality of keys combine, when the lid (7) is open, to provide a QWERTY keyboard. A third plurality of keys (10) on an outer surface of the lid (7) provide a set of telephone keys for use when the lid (7) is closed. An electronic display (6) is provided on a surface of the body portion (2), the display (6) being visible to a user when the lid (7) is in both the open and closed positions. Display control means is arranged to display information on the display (6) with a first orientation when the lid (7) is in the open position and with a second orientation, substantially at right angles to said first orientation, when the lid (7) is in the closed position.

7 Claims, 5 Drawing Sheets

PORTABLE ELECTRONIC APPARATUS

FIELD OF THE INVENTION

The present invention relates to portable electronic apparatus and in particular, though not necessarily, to portable electronic communication apparatus.

BACKGROUND OF THE INVENTION

Many different types of portable electronic devices are currently available which use a small display screen, e.g. a liquid crystal display, and a keyboard for entering data into the device. Examples of such devices include pocket calculators, personal digital assistants (PDA), and cellular telephones. More recently, a new type of device has become available which combines the functions of a cellular telephone and a personal digital assistant. Particularly in the case of the latter type of device, there is a strong desire to reduce the overall size of the device in order to allow it to be more easily carried by a user.

EP 0534478 describes a portable telephone set including an electronic notebook function, i.e. of the combined cellular telephone/PDA type. The device has a body portion on which a number of electronic notebook keys are provided. A lid is hingeably connected to the body portion, the lid having telephone keys provided on both its inner and outer surfaces. When the lid is closed over the body portion, the notebook keys are covered by the lid and only the telephone keys provided on the outer surface of the lid are accessible. When the lid is open, both the telephone keys on the lid's inner surface and the notebook keys are accessible. The body portion is provided with an elongate display which is visible both when the lid is closed and when it is open.

EP 0472361 describes a similar type of portable device having a body portion on which are provided a number of notebook keys and a display screen. A lid portion is hingeably connected to the body portion and when the lid is in the closed position the lid partially covers the display. On the outer surface of the lid there are provided a number of telephone keys which allow a user to make a telephone call when the lid is closed. A number of additional notebook keys are provided on the inner surface of the lid.

SUMMARY OF THE INVENTION

According to a first aspect of the present invention there is provided electronic apparatus comprising:

a body portion;

a lid hingeably coupled to the body portion and moveable about a hinged joint between open and closed positions in which a surface portion of the body portion is respectively uncovered and covered by the lid;

a first plurality of data input keys on said surface portion of the body portion;

a second plurality of data input keys on an inner surface of the lid;

a third plurality of data input keys on an outer surface of the lid;

an electronic display on a surface of the body portion, the display being visible to a user when the lid is in said open and closed positions; and display control means for displaying information on the display with a first orientation when the lid is in the open position and with a second orientation, substantially at right angles to said first orientation, when the lid is in the closed position.

Embodiments of the present invention may be arranged such that the display is suitably oriented both when the apparatus is used with the lid closed (e.g. with only a reduced keypad accessible) and when it is used with the lid open (e.g. with an extended keypad accessible).

Preferably, said body portion of the electronic apparatus is elongate, with said electronic display being provided at a first end region of the body portion and said lid being hingeably coupled to a second end region, opposite to said first end region, of the body portion. Preferably, said hinged joint is arranged to enable the lid to be moveable about an axis substantially perpendicular to the longitudinal axis of the elongate body portion. More preferably, said display and said first plurality of keys are arranged on the same surface of the body portion.

Preferably, when the lid is in the open position, said first and second plurality of data input keys are arranged so as to provide in combination a QWERTY style keyboard (or equivalent).

The electronic apparatus of the present invention may be a mobile communication device. For example, the device may be arranged to remotely activate a radio telephone unit. With the lid of the device in the closed position, said third plurality of keys may act as control keys for the radio telephone unit. More particularly, the third plurality of keys may provide numeric and other telephone dialling keys for controlling the operation of the radio telephone unit. The device may additionally operate as a personal digital assistant or portable computer, with said first and second plurality of data input keys enabling a user to input data into the PDA or PC, or into a memory of the radio telephone unit.

The electronic apparatus of the present invention may also function as a radio telephone without requiring any additional units. In this case, the third plurality of keys provide numeric and other dialling keys for operating the device as a radio telephone. Again, the device may additionally operate as a PDA or PC into which data is entered using the first and second plurality of data input keys.

Embodiments of the present invention also include for example personal digital assistants, palm-top computers, and pocket calculators.

According to a second aspect of the present invention there is provided an electronic apparatus comprising a body portion, an electronic display on a surface of the body portion, typing mode selection means for implementing a selection between a first typing mode and a second typing mode, a first plurality of data input keys comprising a first set of function keys, each implementing a first key function in the first typing mode and a second key function in the second typing mode, and display control means for displaying information on the display with a first orientation in the first typing mode and with a second orientation, substantially at right angles to said first orientation, in the second typing mode.

According to a third aspect of the present invention there is provided a method of displaying information on an electronic display provided on a body portion of an electronic apparatus, the device comprising a first plurality of data input keys provided on a surface of said body surface, a lid hingeably coupled to the body portion and arranged to cover said first plurality of data input keys in a closed position and having a second plurality of data input keys on an inner surface thereof and a third plurality of keys on an outer surface thereof, wherein the display is visible in both the open and closed positions of the lid, the method comprising displaying information on the display with a first orientation when the lid is in the closed position and displaying information with a second orientation, substantially at right angles to said first orientation, when the lid is in the open position.

BRIEF DESCRIPTION OF THE DRAWINGS

For a better understanding of the present invention and in order to show how the same may be carried into effect reference will now be made, by a way of example, to the accompanying drawings in which.

DETAILED DESCRIPTION

Figure 1:
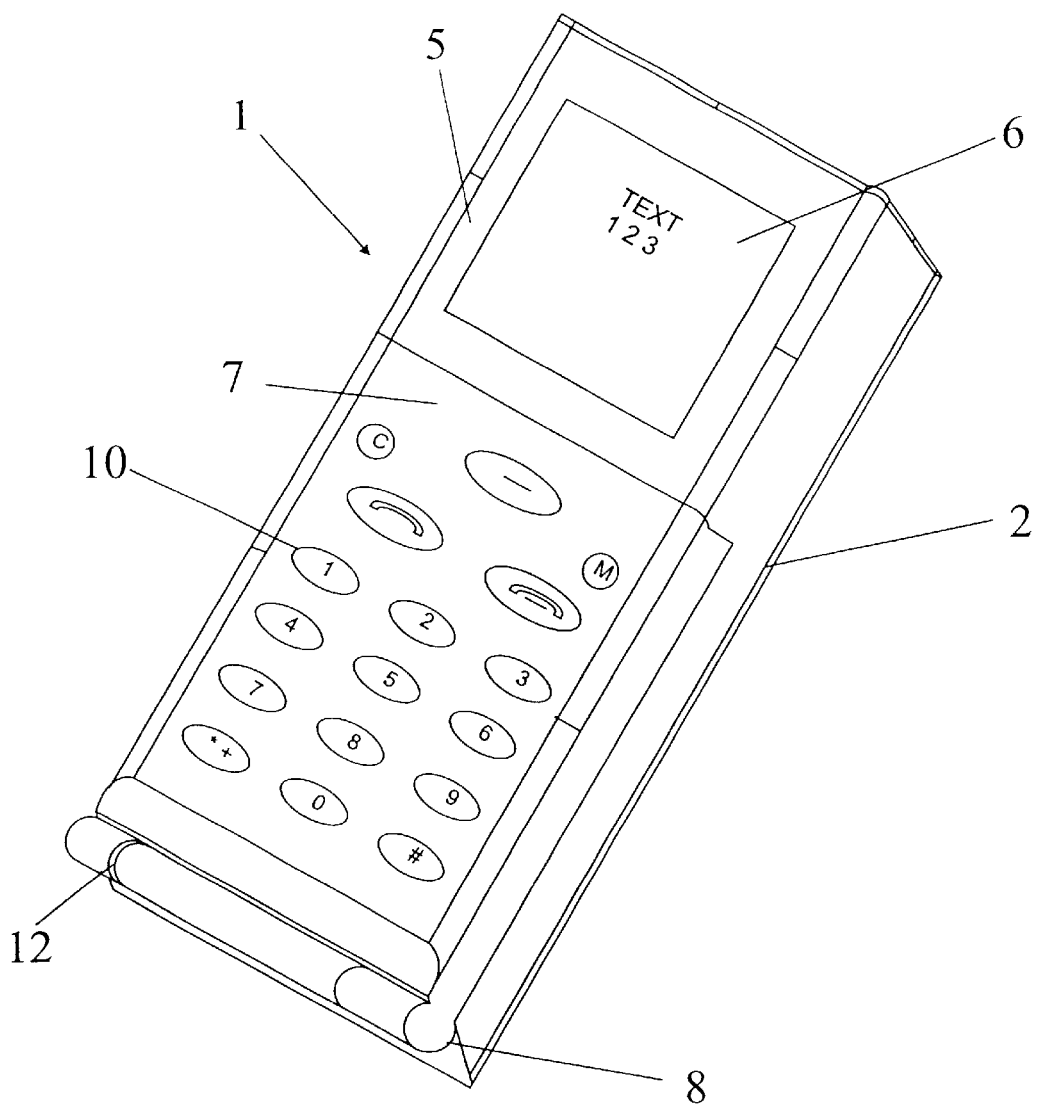
FIG. 1 is a front perspective view of a mobile communication device with a lid of the device in a closed position.
Figure 2:
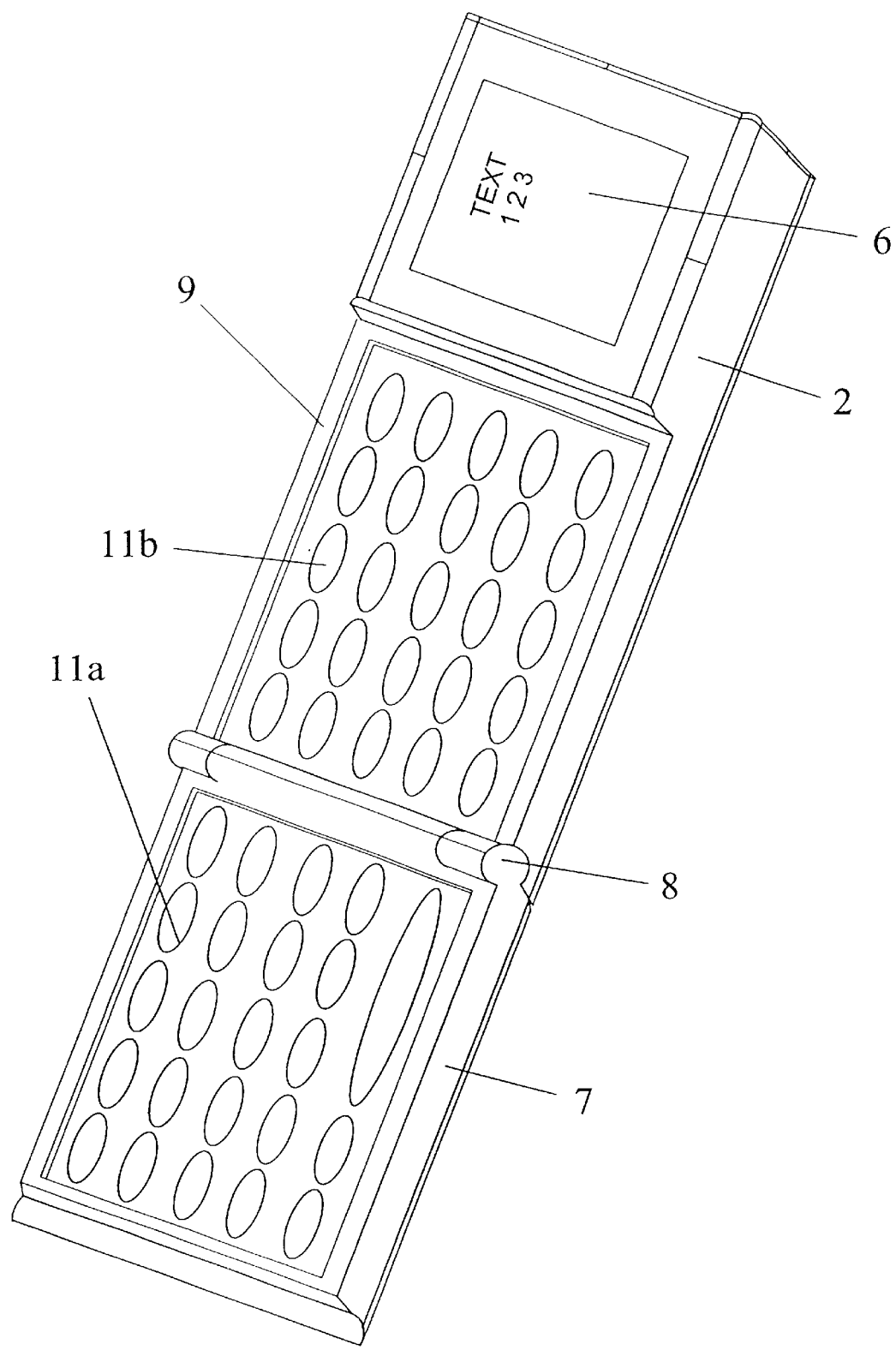
FIG. 2 shows the mobile communication device of FIG. 1 with the lid in an open position.
Figure 3:
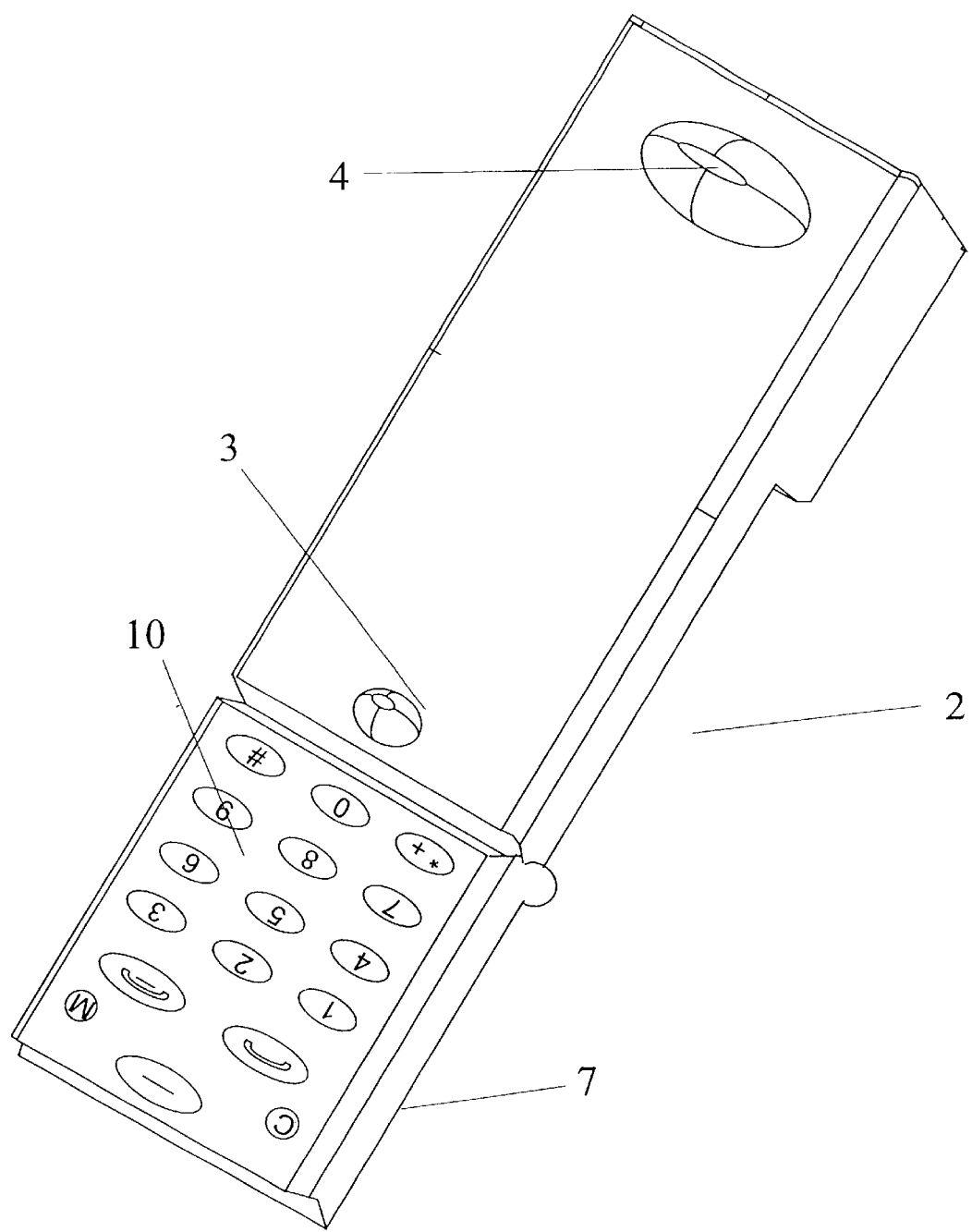
FIG. 3 is a rear perspective view of the device of FIG. 1 with the lid in the open position.

FIGS. 1 to 3 show various views of a mobile communication device 1 which is arranged to provide a user interface of a cellular radio telephone. The device 1 communicates via a short range radio link with a radio unit (not shown in the drawings) which in turn provides the radio link to the cellular telephone network. Such a system may be employed in a vehicle where the radio unit is built into the dashboard of the vehicle and the communication device 1 is releasably held in a dashboard mounted cradle.

The communication device 1 comprises a main body 2 which houses most of the electronic circuitry for controlling the device 1 together with a power supply battery. The body 2 is generally rectangular in cross section and is provided on a rear surface thereof with a microphone 3 and a loudspeaker 4. The loudspeaker 4 and microphone 3 are spaced apart sufficiently to enable a user to speak into the microphone 3 whilst listening to sound emanating from the loudspeaker 4.

On a front surface 5 of the body 2 there is provided a generally square liquid crystal display 6. This display 6 is able to display text information in either of two different orientations as will be explained below. A lid or flip 7 having a generally rectangular cross-sectional shape is hingeably coupled to a lower edge region of the body 2 by a hinge 8 such that the lid 7 can be rotated about a hinge axis which is perpendicular to the longitudinal axes of the lid 7 and the body 2. The main body 2 is provided with a recess 9 in its upper surface such that when the lid 7 is closed over the body 2 the outer surfaces of the body 2 and the lid 7 are flush with one another leaving the display 6 visible at the upper end of the body 2.

The outer surface of the lid 7 is provided with a set of numeric keys and telephone dialling control keys 10 including "off-hook", "on-hook", control keys and memory recall keys (collectively termed the "telephone keypad"). It will be apparent that with the lid 7 in the closed position, the device 1 has a configuration similar to that of a conventional cellular telephone and a user is able to make and receive calls, via the radio unit, using the telephone keypad 10.

The lid 7 is provided on its inner surface with a set of data entry keys 11a which are accessible to the user when the lid 7 is in the open position. In this open position, a set of data entry keys 11b, provided in the recess 9 of the body 2, are also accessible. The two sets of data entry keys 11a, 11b together form an elongate "extended" keyboard, e.g. with a QWERTY style layout, which may be used to enter data into the device 1 when the device is operating as a personal digital assistant.

Considering now in more detail the display 6, this is controlled when the lid 7 is in the closed position to display lines of text perpendicularly to the longitudinal access of the device 1 (as illustrated in FIG. 1). In this way, text is displayed in the manner in which it would be displayed on a conventional cellular telephone and facilitates easy use of the device by a user who is familiar with using a cellular telephone.

With reference now to FIG. 2, with the lid 7 in the open position, the display 6 is controlled to display lines of text parallel to the longitudinal access of the device 1. Thus, a user is able to enter data using the extended keyboard 11a, 11b in a normal orientation (and for example using two-hands) whilst viewing entered or retrieved information on the display 6. The user does not need to turn his head to an awkward angle or to be able to read lines of text at right angles.

Figure 4:
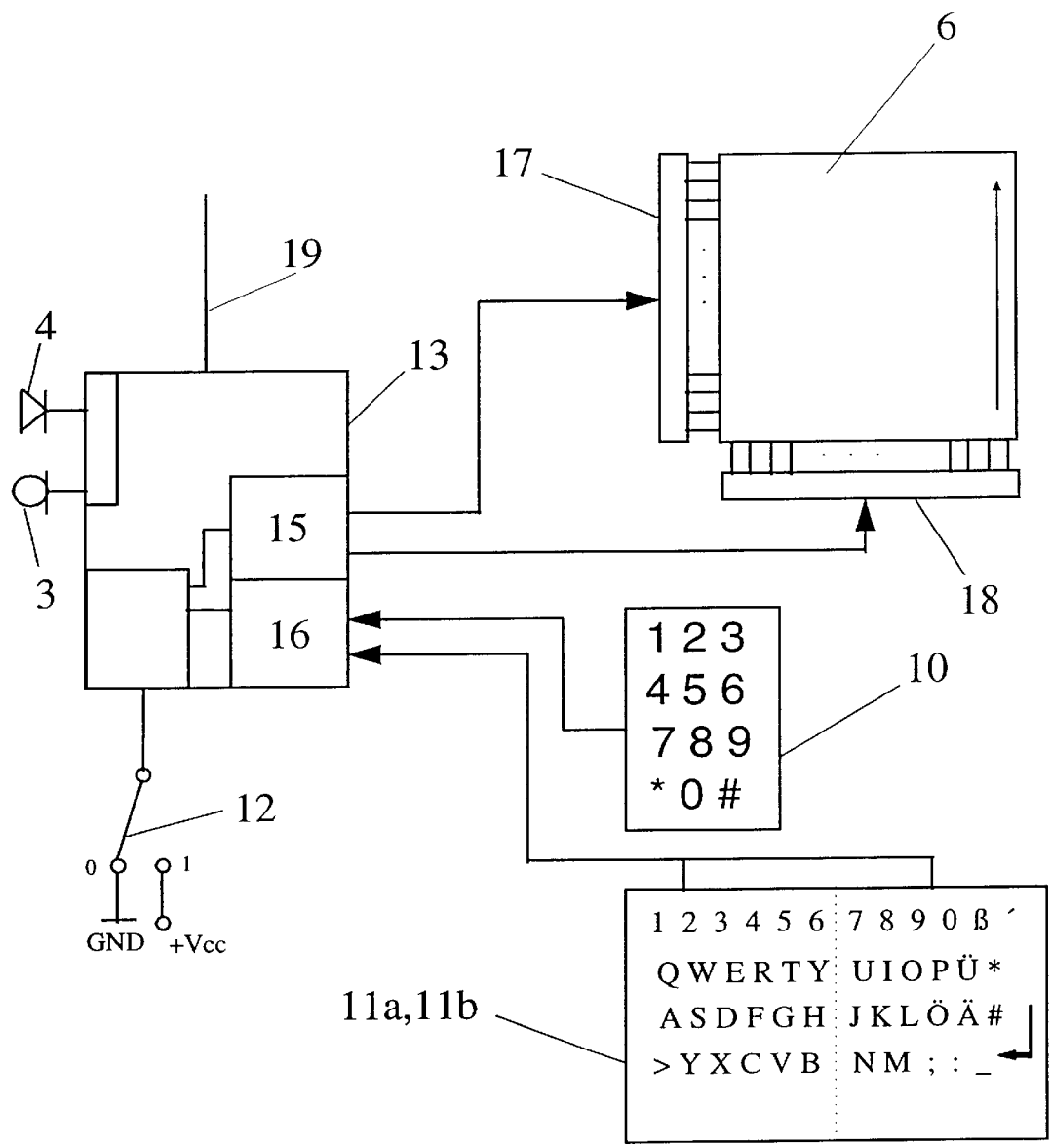
FIG. 4 shows in block diagram form control and display circuitry of the device of FIGS. 1 to 3.

Circuitry for controlling the orientation of the device display 6 is shown in block diagram form in FIG. 4 (the arrow shown inside the display 6 in FIG. 4 indicates the longitudinal axis of the communication device 1). A microprocessor 13 of the circuitry performs a variety of functions including audio processing of signals received from the microphone 3 and transmitted to the loudspeaker 4, RF control via lines 19, and general data processing operations. However, as these are substantially conventional, only the role of the microprocessor in controlling the display will be described here.

The circuitry comprises a mechanical switch 12 contained in the hinge 8 for detecting whether the lid 7 is in the open or the closed position. With the lid 7 in the closed position, the switch 12 connects an interrupt of the microprocessor 13 to a logic low level (GND). With the lid 7 in the open position, the microprocessor interrupt is connected by the switch 12 to a logic high level (+$V_{cc}$). Software controls the microcontroller to provide a horizontal-vertical mode controller 14 which receives the signal placed on the microprocessor interrupt via the switch 12. Software also causes the microprocessor 13 to provide a display controller 15 and a keyboard controller 16, both controlled in turn by the horizontal-vertical mode controller 14. The telephone keys 10 and the extended keyboard 11a, 11b are connected to the microprocessor 13 and functionally to the keyboard controller 16. The circuitry further comprises first and second display drivers 17, 18 which drive respective perpendicular sets of display lines of the LCD display 6. The display drivers 17, 18 are connected to the microprocessor 13 and functionally to the display controller 15.

With the lid 7 closed, the interrupt is set to logic low and the horizontal-vertical mode controller 14 controls the keyboard controller 16 to activate the telephone keypad 10 and to deactivate the extended keyboard 11a, 11b. The horizontal-vertical mode controller 14 also controls the display controller 15 to operate the display driver 17 as a horizontal line driver and the display driver 18 as a vertical line driver. The result is that data received from the telephone keypad, or recalled from a memory of the device (not shown), is displayed in lines which are perpendicular to the longitudinal access to the device 1.

With the lid 7 open, microcontroller interrupt is at logic high. The horizontal-vertical mode controller 14 causes the keyboard controller 16 to inactivate the telephone keypad 10 and to activate the extended keyboard 11a, 11b. The horizontal-vertical mode controller 14 also controls the display controller 15 to select display driver 17 as a vertical display driver and the display driver 18 as a horizontal display driver. Data received from the extended keyboard, or recalled from memory, is therefore displayed in lines which are parallel to the longitudinal access of the device 1.

Figure 5:
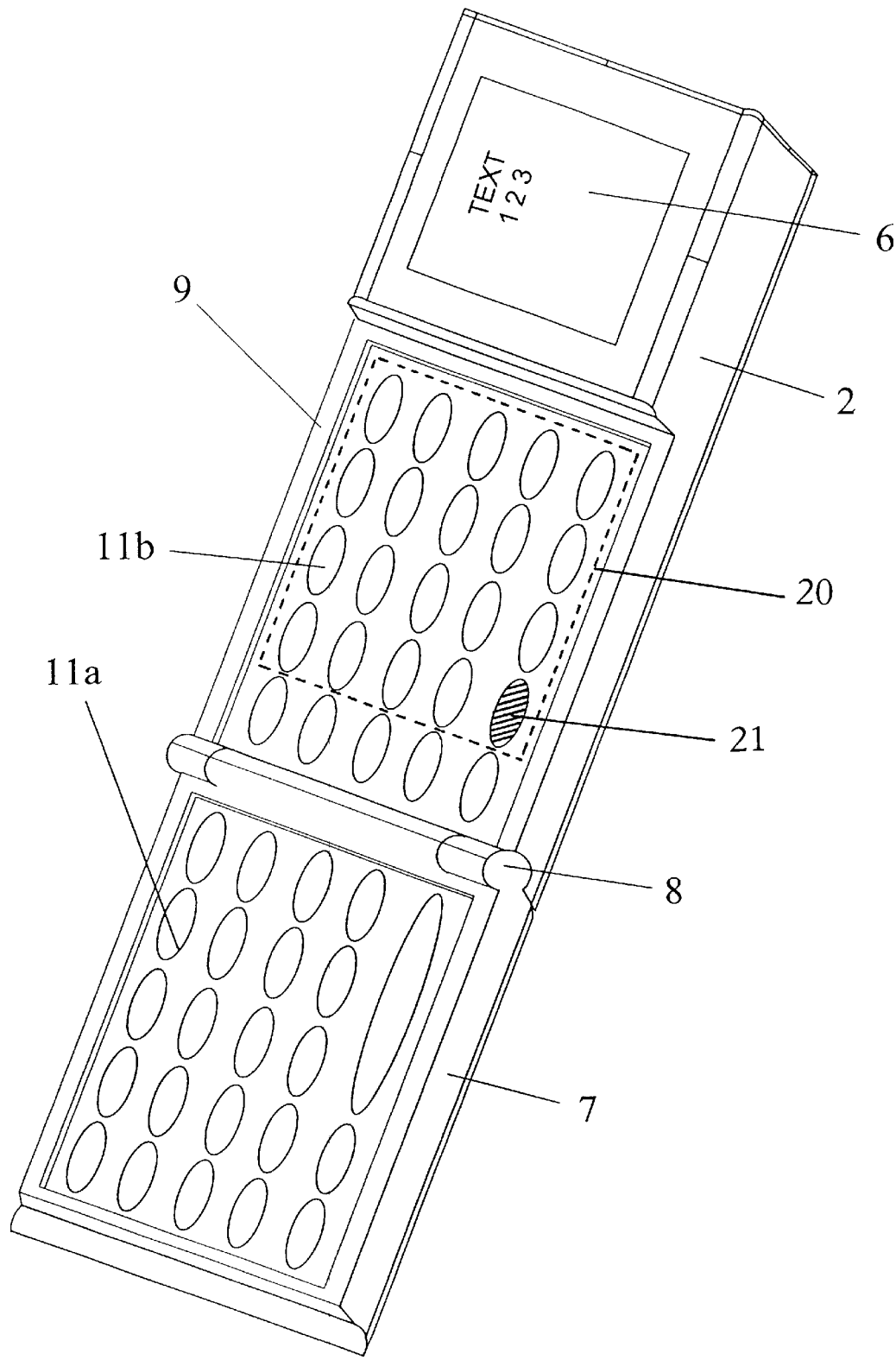
FIG. 5 illustrates a layout for a set of data entry keys associated with two different typing modes in a front perspective view of a mobile communication device.

In another aspect of the invention, a set of keys act as keys of a telephone keypad and keys of an alphanumeric keypad, depending on the typing mode set by the user. Referring to FIG. 5, a first set of function keys 20 in the extended keyboard 11b provided in the recess of the body 2 are arranged to act as a telephone keypad, when the device is used in a first typing mode, e.g. in a conventional cellular telephone mode. In this mode lines of text in the display 6 are displayed perpendicularly to the longitudinal access of the device 1. In a second typing mode, the same first set of function keys 20 will operate in a different orientation normally as part of the alphanumeric (e.q. QWERTY style layout) data entry keys 11b. In this mode the display 6 is controlled to display lines of text parallel to the longitudinal access of the device 1. Thus, the user is able to operate the device as a mobile terminal using the set of function keys 20 in a perpendicular orientation and viewing information in the display 6 using the same orientation. Correspondingly the user is able to enter data using the extended keyboard 11a, 11b in a parallel orientation whilst viewing information in the display 6 using the same parallel orientation.

The user can select the typing mode by entering a command through the user interface e.g. by pressing a specific key 21 assigned for such an indication, or by choosing an appropriate menu option in the user interface software. A user-operable switch corresponding to the operation of the automatic lid position switch 12 in the aspect of the invention can be arranged to the device for indicating the choice between typing modes. The selection of the user will generate a signal to the horizontal-vertical mode controller 14, which in turn will control the display controller 15 and the keyboard controller 16 according to the selection.

When a lid hingeably coupled to the body portion of the device is used, the set of function keys 20 is preferably on the part of the extended keyboard 11b provided in the recess of the body 2, as shown in FIG. 5. When a lid slidingly coupled to the body portion of the device is used, the set of function keys 20 is preferably on the outer surface of the lid and the extended keyboard will comprise the keys in the outer surface of the lid and the keys 11b in the recess of the body that are exposed when the lid is slided in the open position. With a sliding coupling, the automatic choice of the typing mode according to the lid position, as explained earlier, can be used.

It will be appreciated by a person skilled in the art that modifications may be made to the above described embodiment without departing from the scope of the present invention.

What is claimed is:

1. Electronic apparatus comprising:
    a body portion;
    an electronic display on a surface of the body portion;
    typing mode selection means for implementing a selection between a first typing mode and a second typing mode;
    a first plurality of function keys, each implementing a first key function in the first typing mode and a second key function in the second typing mode;
    display control means for displaying information on the display with a first orientation in the first typing mode and with a second orientation, substantially at right angles to said first orientation, in the second typing mode; and
    wherein the electronic display and the function keys are separated from each other so that when information is being keyed in with the function keys the keyed in information is simultaneously visible on the electronic display both in the first and the second typing modes.

2. An electronic apparatus according to claim 1, further comprising
    a lid hingeably coupled to the body portion and moveable about a hinged joint between open and closed positions in which a surface portion of the body portion is respectively uncovered and covered by the lid;
    a first plurality of data input keys comprising said first plurality of function keys on said surface portion of the body portion to be used when the lid is in said closed position;
    a second plurality of data input keys on an inner surface of the lid to be used when the lid is in said open position; and
    the display being visible to a user when the lid is in said open and closed positions.

3. An electronic apparatus according to claim 1, further comprising
    a lid coupled to the body portion and slidingly moveable between open and closed positions in which a surface portion of the body portion is respectively uncovered and covered by the lid;
    a first plurality of data input keys comprising said first plurality of function keys on an outer surface of the lid;
    a second plurality of data input keys on said surface portion of the body portion;
    an electronic display on a surface of the body portion, the display being visible to a user when the lid is in said open and closed positions.

4. Electronic apparatus comprising:
    a body portion;
    a lid hingeably coupled to the body portion and moveable about a hinged joint between open and closed positions in which a surface portion of the body portion is respectively uncovered and covered by the lid;
    a first plurality of data input keys on said surface portion of the body portion having a first orientation;
    a second plurality of data input keys on an inner surface of the lid having said first orientation;
    a third plurality of data input keys on an outer surface of the lid having a second orientation, substantially at right angles to said first orientation;
    an electronic display on a surface of the body portion, the display being entirely visible to a user when the lid is in said open and closed positions; and
    display control means for displaying information on the display with a first display orientation when the lid is in the open position and with a second display orientation, substantially at right angles to said first display orientation, when the lid is in the closed position, and
    wherein when the lid is in the open position, said first and second plurality of data input keys are arranged to provide in combination a QWERTY style keyboard and the inner surface of the lid is on the same level with the surface portion of the body portion leaving the first and second plurality of data input keys on the same level.

5. An electronic apparatus according to claim 4, wherein when the lid is in the open position the outer surface of the lid is on the same level as a bottom surface of the body portion.

6. A method of displaying and inputting information on an electronic display provided on a body portion of an electronic apparatus, the device comprising a first plurality of data input keys provided on a surface of said body surface and having a first orientation, a lid hingeably coupled to the body portion and arranged to cover said first plurality of data input keys in a closed position and having a second plurality of data input keys on an inner surface thereof having said first orientation and a third plurality of keys on an outer surface thereof having a second orientation, substantially at right angles to said first orientation, wherein the display is visible in both the open and closed positions of the lid, the method comprising displaying information on the display with a first display orientation when the lid is in the closed position and displaying information with a second display orientation, substantially at right angles to said first display orientation, when the lid is in the open position, and wherein when the lid is in the open position, said first and second plurality of data input keys providing in combination a QWERTY style keyboard and the inner surface of the lid is provided on the same level with the surface portion of the body portion leaving the first and second plurality of data input keys on the same level for inputting information with the QWERTY style keyboard.

7. A method according to claim 6, wherein opening the lid into the open position brings the outer surface of the lid to the same level as a bottom surface of the body portion.

* * * * *